(12) United States Patent
Chen et al.

(10) Patent No.: US 7,027,690 B2
(45) Date of Patent: Apr. 11, 2006

(54) OPTICAL WAVEGUIDE COUPLER CIRCUIT DEVICE

(75) Inventors: Baoxue Chen, Yamatokoriyama (JP); Mamoru Iso, Oume (JP)

(73) Assignee: Nitta Corporation, Osaka (JP)

( * ) Notice: Subject to any disclaimer, the term of this patent is extended or adjusted under 35 U.S.C. 154(b) by 305 days.

(21) Appl. No.: 10/610,590

(22) Filed: Jul. 2, 2003

(65) Prior Publication Data
US 2004/0067022 A1 Apr. 8, 2004

(30) Foreign Application Priority Data
Jul. 2, 2002 (JP) ............................. 2002-193818

(51) Int. Cl.
*G02B 6/26* (2006.01)
(52) U.S. Cl. ...................................... 385/42
(58) Field of Classification Search ................. 385/31, 385/32, 39, 41, 42
See application file for complete search history.

(56) References Cited

U.S. PATENT DOCUMENTS

| | | | |
|---|---|---|---|
| 5,247,594 A | 9/1993 | Okuno et al. | |
| 5,481,633 A | 1/1996 | Mayer | |
| 5,499,308 A | 3/1996 | Arai et al. | |
| 6,134,361 A | 10/2000 | Urino | |
| 6,285,810 B1 * | 9/2001 | Fincato et al. | ................ 385/24 |
| 2003/0165295 A1 * | 9/2003 | Doerr | ......................... 385/39 |
| 2003/0174955 A1 * | 9/2003 | Chen et al. | ................... 385/42 |

FOREIGN PATENT DOCUMENTS

EP 0 493 132 A1 7/1992
JP 10227931 A * 8/1998

OTHER PUBLICATIONS

Junguji, K. et al., "Mac-Zehnder Interferometer Type Optical Wavegduie Coupler with Wavelength-Flattened Coupling Ratio," Electronics Letters, Aug. 16, 1990, pp 1326-1327, vol. 26, No. 17.*

(Continued)

*Primary Examiner*—Juliana K. Kang
(74) *Attorney, Agent, or Firm*—Buchanan Ingersoll PC

(57) ABSTRACT

The present invention relates to an optical waveguide coupler device. As shown in FIG. 1, the optical waveguide coupler device 8 comprises two optical waveguide cores 2, 3 formed on the surface of a substrate 1. The optical waveguide cores 2, 3 are covered by lower and upper cladding layers 6, 7 both formed on the substrate 1; and the two optical waveguide cores 2, 3 are brought close to and in parallel with each other at two sites to form two directional couplers 4, 5 there. The cross-section and refractive index of each of the optical waveguide cores 2, 3 and the parameters of other elements of the circuit are optimized such that an optical signal is reliably routed by the circuit without undergoing a wavelength shift even when the circuit is exposed to the changes of polarization and ambient temperature.

12 Claims, 5 Drawing Sheets

OTHER PUBLICATIONS

Kang et al., "All-optical March-Zehnder modulator using a photochromic dye-doped polymer," Applied Physics Letters, Mar. 11, 2002, pp 1710-1712, vol. 80, No. 10, American Institute of Physics, NY.

Kostrzewa et al., "Tunable Polymer Optical Add/Drop Filter for Multiwavelength Networks," IEEE Photonics Technology Letters, Nov. 1, 1997, pp 1487-1489, vol. 9, No. 11, IEEE Inc., NY (XP-000722979).

Kobayashi et al., "Tunable and Polarization-Insensitive Arrayed-Waveguide Grating Multiplexer Fabricated fromFluorinated Polyimides," IEICE Transactions on Electronics, Jul. 1998, pp 1020-1026, vol. E81-C, No. 7, Institute ofElectronics Information and Comm. Eng., Tokyo, JP (XP-000848080).

Kobayashi et al., "Single-mode optical waveguides fabricated from fluorinated polyimides," Applied Optics, Feb. 20, 1998, pp 1032-1037, vol. 37, No. 6, Optical Society of America, Washington, DC (XP-000741436).

Jinguji et al., "Mach-Zehnder Interferometer Type Optical Waveguide Coupler with Wavelength-Flattened Coupling Ratio," Electronics Letters, Aug. 16, 1990, pp1326-1327, vol. 26, No. 17, IEE, Stevenage, GB (XP 000108989).

* cited by examiner

OPTICAL WAVEGUIDE COUPLER CIRCUIT DEVICE

BACKGROUND OF THE INVENTION

1. Field of the Invention

The present invention relates to a polymer-based optical waveguide circuit stable to the changes of particularly, a polarization and ambient temperature which is profitably used as a wavelength division multiplexer or demultiplexer in, for example, fiber optic communication.

2. Description of the Related Art

In a dense wavelength division multiplexing (DWDM) system applied to optical carriers belonging to S, C and L bands, the wavelength independent waveguide coupler has been used that is capable of routing optical carriers comprising 80–100 nm bands around 1550 nm into two channels at a specified split ratio, being unaffected with their wavelengths. The coupler that routes optical carriers at a split ratio of 1:1 is called a 3 dB coupler and has been used in multiple fiber optic communication systems.

Such a wavelength independent waveguide coupler includes a Mach-Zehnder interferometer type optical circuit 17 as shown in FIG. 9. The circuit comprises two waveguide cores 13, 14 formed on the surface of a substrate 20 prepared from a quartz or silicon wafer. (K. Jinguji et al., "Mach-Zehnder interferometer type optical waveguide coupler with wavelength-flattened coupling ratio," Electron. Lett., 1990, Vol. 26, No. 17, pp. 1326–1327 and The publication of unexamined application No.213829/1991).

The waveguide cores 13, 14 are covered with lower and upper cladding layers 18, 19 both of which are formed on the substrate 20. When the core and cladding layers are mainly composed of silicon dioxide ($SiO_2$), the resulting optical circuit is called a quartz waveguide. When they are composed of a polymer, the resulting optical circuit is called a polymeric waveguide.

The Mach-Zehnder interferometer type optical circuit 17 comprises two directional couplers 15, 16 which are obtained by bringing the two waveguide cores 13, 14 close to and in parallel with each other. The Mach-Zehnder interferometer type optical circuit 17 receives an optical signal having a band width of 80–100 nm around 1550 nm either from a terminal 13a or 14a connected respectively to the waveguide core 13 or 14 and splits the signal at a split ratio of 1:1 to deliver two outputs each having an intensity half that of the transmitted signal from terminals 13b, 14b, or the other terminals of the waveguide cores 13, 14.

An application of such a Mach-Zender interferometer type optical circuit 17 includes 2×2N splitter as shown in FIG. 2. The 2×2N splitter comprises 3 dB coupler 9 independent of its wavelength with a waveguide circuit same as a Mach-Zender inteferometer type optical circuit 17, and a waveguide branch circuit 10 having paralleled two 1×2N splitter in series with said coupler 9. This 2×2N splitter as shown in FIG. 2 achieves a function of light power splitter with a wave band required for DWDM.

For example, according to the 2×2N splitter shown in FIG. 2, it is possible to deliver equally signal as separate outputs $10_1, 10_2, \ldots 10_{2N}$ of waveguide branch circuit 10 to receive optical signals each having a band width of 80–100 nm around 1550 nm from a terminal 9a of the 3 dB coupler 9 independent of its wavelength. In case signals are received at 9b, signals are output at terminals $10_1, 10_2, \ldots 10_{2N}$ as a same manner. In ordinary communication system, taking into account of security, either one of terminal 9a or 9b is reserved as a supplement.

However, because the 2×2N splitter shown in FIG. 2 includes the waveguides made from a polymer, its optical characteristics are apt to vary in the presence of changes of the ambient temperature, and thus the temperature range under which it can normally operate is rather limited. Further a polymer has a birefringence and the characteristics are apt to vary in the presence of the direction of light polarization used. Thus the loss characteristics dependent of polarization (PDL) is rather worse. However, said waveguide branch circuit 10 of the rear part of the 2×2N splitter shown in FIG. 2 made from a polymer waveguides are unaffected by the ambient temperature and the change of the polarization. (Bao-Xue Chen et al, "Optical Coupler", U.S. Pat. No. 5,757,995). Therefore the 3 dB coupler 9 independent of wavelength of the front part of the 2×2N splitter shown in FIG. 2 should be carefully designed. The temperature coefficient of the refractive index of a polymer material used for the construction of the waveguides is ten or more times as high as that of quartz and its birefringence (a double refraction) is about 0.0082, as that of quartz is about Zero. Therefore, if the ambient temperature changes, the polymeric waveguides 9, 10 and cladding layers covering those waveguides will undergo a great change in their refractive indices; the parameters of the optical circuit including those waveguides and cladding layers will also shift from the designed ranges, and the performance of the optical circuit will depart from the designed level.

Analyzing a Mach-Zender inteferometer type optical circuit 17 shown in FIG. 9, as the same structure as the 3 dB coupler 9 independent of its wavelengh, When a refraction of said waveguide core 13 and 14, and the cladding around said waveguide core change remarkably due to the alteration of the temperature, degraded performance as a result of this alteration of the ambient temperature is mainly ascribed to the following two reasons; The first reason is; a combination factor designed is modified due to a change of a complete combination length of said two directional coupler 15 and 16. The second reason is; a power distribution ratio is modified in the presence of a phase difference which is produced as a result of properly chosen path length difference between two waveguide core 13 and 14. Further a equivalent refraction of a waveguide is modified due to a effect of a birefringence (a double refraction) in the presence of a change of a polarization plane of a input signal. Therefore, because a complete combination length of two directional couplers 15 and 16, and a phase difference which is produced as a result of properly chosen path length difference between the two waveguide cores 13 and 14 will change, a power distribution ratio will shift from the designed ranges.

For solving the problem on a dependence of temperature, it is necessary to redesign the overall structure. Similar problems above are also observed in certain types of quartz optical waveguide circuits. The refractive index of a quartz material has a positive temperature coefficient whose absolute value is smaller than that of a corresponding polymeric material. Therefore, a known method for preparing an optical waveguide circuit from quartz consists of covering a quartz waveguide core with a polymeric coat whose refractive index has a negative temperature coefficient sufficiently large to cancel the positivity of the temperature coefficient of the quartz waveguide core. However, generally a polymeric material has a refractive index whose temperature coefficient has too large a negative value to cancel the positivity of the temperature coefficient of a quartz material. Naturally, this method can not be applied for the polymeric optical waveguide circuit here concerned.

A known method for compensating for the thermal characteristics of a polymeric waveguide core is to employ a substrate made from a polymer having a high thermal expansion. To put it more specifically, this method consists of employing a polymeric substrate which has a thermal expansion sufficiently high to cancel the negative temperature coefficient of the refractive index of a polymeric waveguide core. However, a substrate made from quartz or silicon generally has a low thermal expansion, and thus as far as based on this method, it will not be possible to integrate optical waveguide circuits on a silicon substrate as in the conventional electronic technology where semiconductor devices are integrated on a silicon substrate.

SUMMARY OF THE INVENTION

For solving the problem on the characteristics dependent of polarization, the method for canceling a characteristics dependent of polarization is being proposed; providing recess in a cross section of a waveguide and inserting wave plate of a thin layer in said recess, and rotating rectangularly a polarization plane and canceling an effect of a rotation. However to achieve above effect, it is necessary to provide a mirror symmetric printed circuit in the waveguide circuit. This circuit is used in a symmetric structure such as AWG, but is not applied to a coupler which achieves performance independent of wavelength by means of asymmetric of light waveguide circuit. Further a requirement for providing a recess and inserting wave plate in its manufacturing process, is so complicate and severe. Furthermore, microscope processing is necessary and a extraction rate, i.e, a yielding percentage is worse and its production cost is high.

Accordingly, the object of the present invention is to provide a Mach-Zehnder interferometer-based polymeric waveguide circuit unaffected with the change of polarization and ambient temperature which is obtainable by arranging waveguides on a silicon or quartz substrate using conventional IC technology, while maintaining the advantage of low production cost which is the most important impetus for the introduction of polymeric optical waveguide circuits.

In a polymeric optical waveguide coupler circuit, according to a application, the optical waveguide coupler circuit give priority to a characteristics dependent of temperature or give priority to both the characteristics dependent of temperature and polarization. Inventors of this application previously proposed a polymeric optical waveguide coupler circuit which could suppress the fluctuation of output which is produced as a result of change of ambient temperature, taking into account of the characteristics independent of temperature.

A first aspect of the present invention is to provide an optical waveguide coupler circuit device comprising a substrate; a polymeric lower cladding layer formed on the substrate; at least two polymeric optical waveguides formed on the polymeric lower cladding layer; a polymeric upper cladding layer covering the optical waveguides; and plural directional couplers which are obtained by choosing any pair from the at least two optical waveguides, bringing them close to each other at plural sites, wherein the two paired optical waveguides are configured such that the difference between their effective optical paths spanning between arbitrarily chosen adjacent directional couplers is defined as $\Delta L$, and $\Delta L=0.7$ to $0.9$ μm, each of the plural directional couplers comprises a parallel section at which the two optical waveguides are disposed in parallel with each other, and the polymeric optical waveguide is made from a polymer having a refractive index of 1.508 to 1.568 and a birefringence (a double refraction) of 0.008 to 0.01.

Another aspect of the present invention is to provide optical waveguide coupler circuit device comprising the polymeric lower cladding layer is made from a polymer having a refractive index of 1.503 to 1.562 and a birefringence (a double refraction) of 0.008 to 0.01.

A further aspect of the present invention is to provide an optical waveguide coupler circuit device comprising the polymeric upper cladding layer is made from a polymer having a refractive index of 1.503 to 1.562 and a birefringence (a double refraction) of 0.008 to 0.01.

A further aspect of the present invention is to provide an optical wave-guide coupler circuit device wherein the length of the two optical waveguides of one directional coupler is chosen to be 0.101 to 0.128 mm while the length of the two optical waveguides of the other directional coupler is chosen to be 1.454 to 1.612 mm.

A further aspect of the present invention is to provide an optical waveguide coupler circuit device wherein the gap between two parallel running waveguides is chosen to be 4.3 to 5.1 μm for both directional couplers.

A further aspect of the present invention is to provide an optical waveguide coupler circuit device wherein each of the optical waveguides is configured to have an oblong cross-section having a width w and a thickness t.

A further aspect of the present invention is to provide an optical waveguide coupler circuit device wherein each of the optical waveguides is configured to have a square cross-section.

A further aspect of the present invention is to provide an optical waveguide coupler circuit device wherein each of the optical waveguides is configured to have a square cross-section with a side of 6 to 8 μm.

A further aspect of the present invention is to provide an optical waveguide coupler circuit device wherein a lower cladding layer of the optical waveguides is configured to have a thickness of 20 μm.

A further aspect of the invention is to provide an optical waveguide coupler circuit device wherein the substrate is made of a quartz plate.

A further aspect of the present invention is to provide an optical waveguide coupler circuit device wherein the substrate is made of a silicon plate.

A further aspect of the present invention is to provide an optical waveguide coupler circuit device wherein the substrate is made of a polyimide resin plate.

DESCRIPTION OF THE PREFERRED EMBODIMENTS

The preferred embodiments of the present invention will be described below with reference to attached figures.

Figure 1:
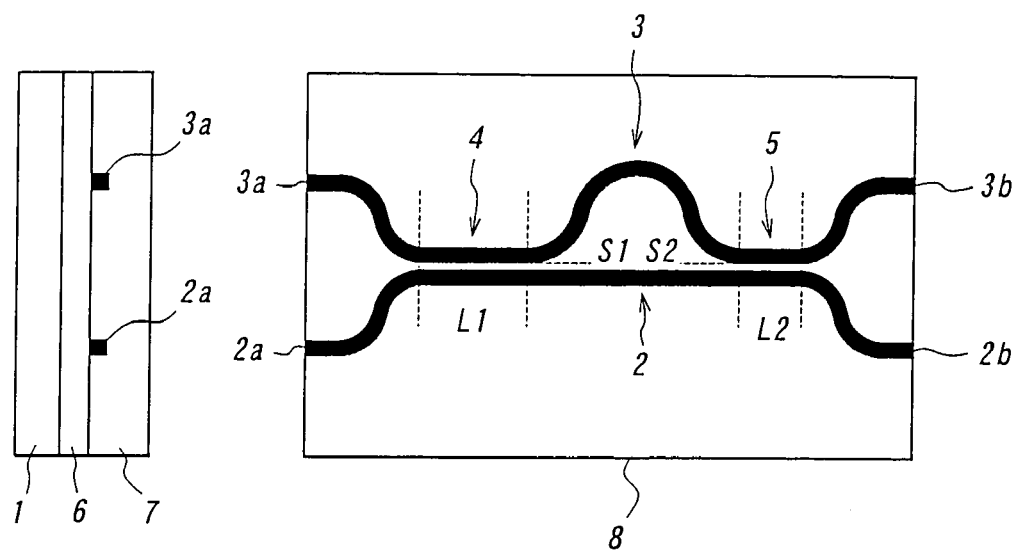
FIG. 1 shows a flat and lateral view of a polymeric optical waveguide coupler device representing an embodiment of this invention.

A polymeric optical waveguide coupler circuit device 8 stable to the changes of polarized light and ambient temperature representing an embodiment of this invention and shown in FIG. 1 comprises two optical waveguide cores 2, 3 formed on the surface of a substrate 1 prepared from a quartz plate, a silicon wafer or a polyimide resin plate and the like. The optical waveguide cores 2, 3 are covered by a lower cladding layer 6 and an upper cladding layer 7 both being formed on the substrate 1. The device 8 further comprises two directional couplers 4, 5 each of which is obtained by bringing the two optical waveguides 2, 3 close to and in parallel with each other. With the optical circuit device 8, the cross-sections and refractive indices of the optical waveguide cores 2, 3, and other circuit parameters are optimized such that the performance of the device is maintained even when light passing through the device undergoes a shift in its wavelength, the polarized light or the ambient temperature is changed.

How this is achieved will be described below.

Referring to FIG. 1, assume that light signal of TE polarized light or TM polarized light enters from a terminal 2a of the optical waveguide core 2 into the optical circuit 8 of FIG. 1; and the light is split into two components with a split ratio of η which are then delivered as outputs from the other terminals 2b, 3b of the optical waveguides 2, 3. Then, the split ratio η expressed in power can be expressed by the following equation:

$$\eta = \frac{|B_{out}|^2}{|A_{out}|^2 + |B_{out}|^2} = a^2 + b^2 + 2ab\cos(\beta \Delta L) \quad (1)$$

$$a = \cos\left[\frac{\pi}{2L_{c1}}(L_1 + L_{e1})\right]\sin\left[\frac{\pi}{2L_{c2}}(L_2 + L_{c2})\right] \quad (2)$$

$$b = \sin\left[\frac{\pi}{2L_{c1}}(L_1 + L_{e1})\right]\cos\left[\frac{\pi}{2L_{c2}}(L_2 + L_{c2})\right] \quad (3)$$

In the above equations, $A_{out}$ and $B_{out}$ represent the amplitudes of the light waves delivered as outputs from the terminals 2b, 3b of the optical waveguide cores 2, 3, $L_{c1}$ and $L_{c2}$; the total coupling lengths of the directional couplers 4, 5, $L_1$ and $L_2$; the lengths of the parallel sections of the directional couplers 4, 5, $L_{e1}$ and $L_{e2}$; the equivalent incremental lengths of the parallel sections of the directional couplers 4, 5, β; the transmission constant of waveguides core 2 and 3 for a mode of light waves, and ΔL; the optical path difference between the two optical waveguide cores 2, 3.

The values of $L_{c1}$ and $L_{c2}$, $L_{e1}$ and $L_{e2}$ and β are dependent on the direction of polarized light.

The above values of $L_{c1}$ and $L_{c2}$, $L_{e1}$ and $L_{e2}$ and β are not only depended on the direction of polarized light, but also $L_{c1}$ and $L_{c2}$, and $L_{e1}$ and $L_{e1}$ can be expressed as a function of the following parameters, λ; the wavelength of a light wave, w and t; the width and thickness of the optical waveguide cores 2, 3, $n_g$; the refractive index of the optical waveguide cores 2, 3, $n_c$; the refractive index of the cladding layers 6, 7, and $s_1$ and $s_2$; gaps of the parallel sections of the directional couplers 4, 5. Therefore, $$L_{ci} = L_{ci}(\lambda, w, t, n_g, n_c, s_i), i=1, 2 \quad (4)$$

$$L_{ei} = L_{ei}(\lambda, w, t, n_g, n_c, s_i), i=1, 2 \quad (5)$$

The transmission constant β can be expressed as a function of the following parameters: λ; the wavelength of a light wave, w and t; the width and thickness of the optical waveguide cores 2, 3, $n_g$; the refractive index of the optical waveguide cores 2, 3, and $n_c$; the refractive index of the cladding layers 6, 7, as follows.

$$\beta = \beta(\lambda, w, t, n_g, n_c) \quad (6)$$

The refractive index $n_g$ of the optical waveguide cores 2, 3, and the refractive index $n_c$ of the cladding layers 6, 7 can be expressed as a function of ambient temperature T and the wavelength λ of a light wave, as follows.

$$n_g = n_g(\lambda, T) \quad (7)$$

$$n_c = n_c(\lambda, T) \quad (8)$$

For a given light wave having a certain band width operating under a given temperature range, taking into account of the polarization mode, the width w and thickness t of the optical waveguide cores 2, 3; gaps $s_1$ and $s_2$ of the parallel sections of the directional couplers 4, 5; the refractive index $n_g$ of the optical waveguide cores 2, 3; the refractive index $n_c$ of the cladding layers 6, 7; the lengths $L_1$, $L_2$ of the parallel sections of the directional couplers 4, 5; and the optical path difference ΔL between the two optical waveguide cores 2, 3 are properly chosen in order to satisfy the following simultaneous equations:

$$\eta(\lambda, T) = 50\% \pm \delta\eta \quad (9)$$

$$|\delta\eta(\lambda, T)|_\lambda = \left|\frac{\partial \eta}{\partial \lambda} \times \delta\lambda\right| < \sigma_\lambda \quad (10)$$

$$|\delta\eta(\lambda, T)|_T = \left|\frac{\partial \eta}{\partial T} \times \delta T\right| < \sigma_T \quad (11)$$

$$\delta\eta = |\delta\eta(\lambda, T)|_\lambda + |\delta\eta(\lambda, T)|_T \quad (12)$$

The resulting optical waveguide circuit will split a light wave at a specified split ratio independent of its wavelength, and being unaffected by the ambient temperature.

In the above calculation, $\sigma_\lambda$ and $\sigma_T$ are chosen so as to make $\delta\eta \leq 1\%$.

For a single mode of polarized light waves, the optical waveguide circuit 8 shown in FIG. 1 can have periodically changing outputs, and thus numerous sets of optimized parameters are conceivable for a given single mode of polarized light waves. If TE and TM modes are conceivable for each light wave, the set of optimized parameters will be doubled.

The optical waveguide circuit having its parameters optimized for splitting a given light wave independent of its wavelength being unaffected by the change of ambient temperature, is further optimized for the polarization of the light wave. For this purpose, statistical optimization is employed. In this operation, $\eta_{lmn}$ is a power split ratio obtained as a result of the above calculation, Q a target value in design, and $D_{1mn}$ a difference between $\eta_{lmn}$ and Q. Thus, $$D_{lmn} = \eta_{lmn} - Q, \; l=1, 2; \; m=1, 2; \ldots; \; n=1,2 \quad (13)$$

where, for the subscripts, l=1, 2 represent TE and TM modes respectively, and m and n represent the sampling numbers of temperature and wavelength respectively. The evaluation function δ statistically representing the agreement between a calculated value and the target value can be expressed by the following equation.

$$\delta = \sum_l \sum_m \sum_n D_{lmn}^2, \; l = 1, 2; \; m = 1, 2, \ldots; \; n = 1, 2, \ldots; \quad (14)$$

When the involved parameters are chosen to minimize δ of the equation (14), and a polymeric optical waveguide coupler device is prepared based on the thus chosen parameters, the coupler device will split an incoming light wave at a specified split ratio independent of its wavelength and polarization, being unaffected by the ambient temperature.

The polymeric optical waveguide coupler circuit 8 stable to ambient temperature changes produced by the above method according to this invention has its parameters optimized as described below.

With regard to the optical circuit device as shown in FIG. 1, its substrate 1 is made from quartz, silicon or a polyimide resin and the like; the optical waveguides 2, 3 from a polymer having a refractive index $n_g$ of 1.508 to 1.568 and a birefringence (a double refraction) of 0.008 to 0.01 and the lower and upper cladding layers 6, 7 for covering the optical waveguides 2, 3 from another polymer having a refractive index $n_c$ of 1.503 to 1.562 and a birefringence (a double refraction) of 0.008 to 0.01 at 1550 nm wavelength. Each of the optical waveguides 2, 3 has a square cross-section with a side of 6 to 8 µm; the parallel section of the directional coupler 4 has a length $L_1$ of 0.101 to 0.128 or 1.454 to 1.612 mm; the parallel section of the directional coupler 5 has a length $L_2$ of 1.454 to 1.612 or 0.101 to 0.128 mm; the gap of the parallel waveguides in the directional coupler 4 has a size $S_1$ of 4.3 to 5.1 µm; the gap of the parallel waveguides in the directional coupler 5 has a size $S_2$ of 4.3 to 5.1 µm; and the optical path difference ΔL between the two optical waveguides 2, 3 is 0.7 to 0.9 µm.

Examples of the present invention will be described below with reference to attached figures.

EXAMPLE

FIG. 1 shows an optical waveguide coupler circuit device of this invention.

The polymeric optical waveguide coupler circuit device 8 stable to the changes of ambient temperature comprises two optical waveguide cores 2, 3 formed on the surface of a substrate 1 made of a quartz plate as shown in FIG. 1. The optical waveguide cores 2, 3 are made from a polymer material having a refractive index $n_g$ of 1.508 to 1.568 and a double refraction of 0.008 to 0.01 as shown in the figure, and has a square cross-section with a side of 6 to 8 µm. The material constituting the lower and upper cladding layers 6, 7 covering the optical waveguide cores 2, 3 is a polymer having a refractive index $n_c$ of 1.503 to 1.562 and a double refraction of 0.008 to 0.01.

The optical waveguide cores 2, 3 form two directional couplers 4, 5 by approaching to and running in parallel with each other at two sites. For the directional coupler 4, the length $L_1$ of the parallel section is 0.101 to 0.128 mm (or 1.454 to 1.612 mm), and the gap $S_1$ between the parallel running waveguides is 4.3 to 5.1 µm. For the directional coupler 5, the corresponding length $L_2$ and gap $S_2$ are 1.454 to 1.612 mm (or 0.101 to 0.128 mm) and 4.3 to 5.1 µm, respectively.

The optical waveguide cores 2, 3 are configured such that the difference between their optical path lengths falls within 0.7 to 0.9 µm.

An exemplary method for fabricating the polymeric optical waveguide coupler circuit device 8 stable to the change of ambient temperature of this invention will be described below.

A quartz plate to serve as a substrate 1 is prepared. A solution of a polymer which will form a lower cladding layer is prepared by dissolving the same molecular amounts of 4,4'-(hexafluoroisopropylidene)diphthalic anhydride and 2,2'-bis(trifluoromethyl)-4,4'-diaminobiphenyl in N,N-dimethylacetamide, and the solution is stirred at 25° C. for 24 hours in the presence of nitrogen. The resulting solution is applied by spin coating onto the substrate 1 to form a coat thereupon. The assembly is removed of the solvent, and subjected to a heating treatment, to form a polymeric lower cladding layer 6 having a thickness of about 20 mm on the substrate 1.

A solution of another polymer is prepared as follows: part of diamine that has been used for producing the polymer responsible for the formation of the lower cladding layer, that is, part of 2,2'-bis(trifluoromethyl)-4,4'-diamonobiphenyl is substituted for another diamine, that is, 4,4'-diaminodiphenyl ether, and the two diamines are added to 4,4'-(hexafluoroisopropylidene)diphthalic anhydride such that the summed molecular amounts of the two diamines are equal to the molecular amount of the latter. The resulting solution is treated as above, and is applied by spin coating onto the above assembly to form a coat on the coat to serve as the lower cladding layer. The assembly is removed of the solvent, and subjected to a heating treatment, to form a polymeric core layer with a thickness of about 6 to 8 µm which has a refractive index higher by about 0.25 to 0.45% than that of the lower cladding layer 6.

A specified optical waveguide pattern is formed via a photo-resist on the surface of the core layer. The core layer is pattern-etched via reactive ion etching in the presence of oxygen gas, to form optical waveguide cores 2, 3 having designed configurations. Then, the same polymer solution as is used for the formation of the lower cladding layer is applied by spin coating to the assembly. The resulting assembly is removed of the solvent and subjected to heating treatment. Thus, an upper cladding layer 7 is formed over the optical waveguide cores 2, 3 to embed the latter. The upper cladding layer 7 must have a refractive index higher than that of the waveguide cores, but needs not to have the same refractive index with that of the lower cladding layer 6.

The above example is related with a substrate 1 made of a quartz plate. The substrate 1 may be made of a silicon plate or a polyimide plate. The optical waveguide core may have an oblong cross-section with a width w and thickness t.

A performance test was conducted on the above exemplary polymeric optical waveguide coupler circuit device 8 stable to the changes of ambient temperature. The test results are as follows.

Figure 3:
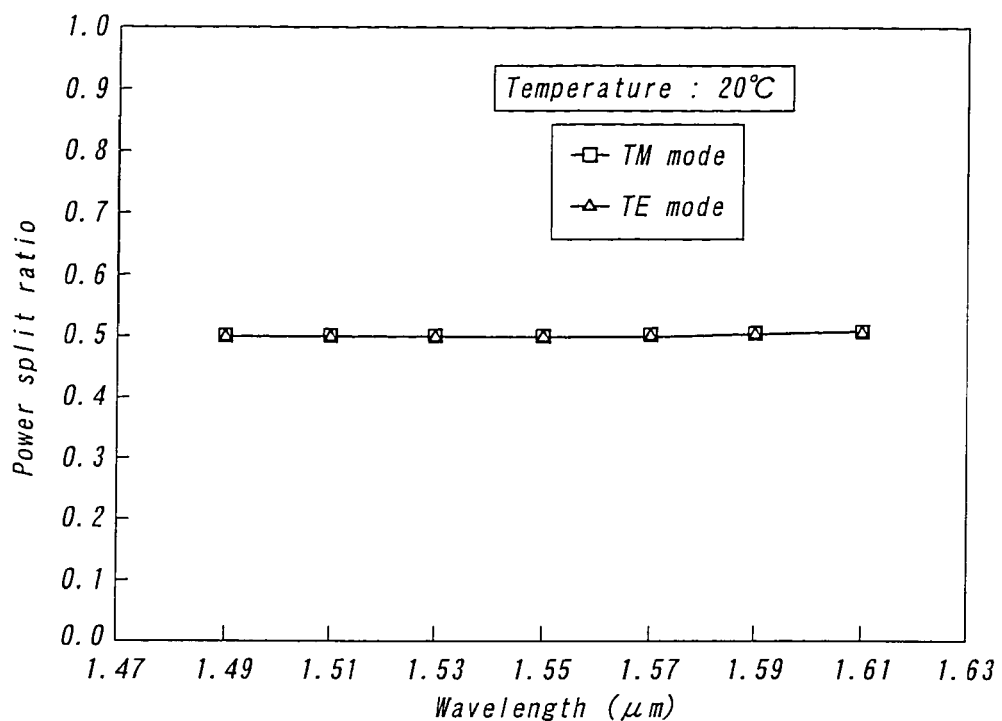
FIG. 3 shows a graph representing the split ratio of the embodiment shown in FIG. 1 to an optical signal when the wavelength and the polarization of the optical signal is varied and the ambient temperature is kept at 20° C.
Figure 4:
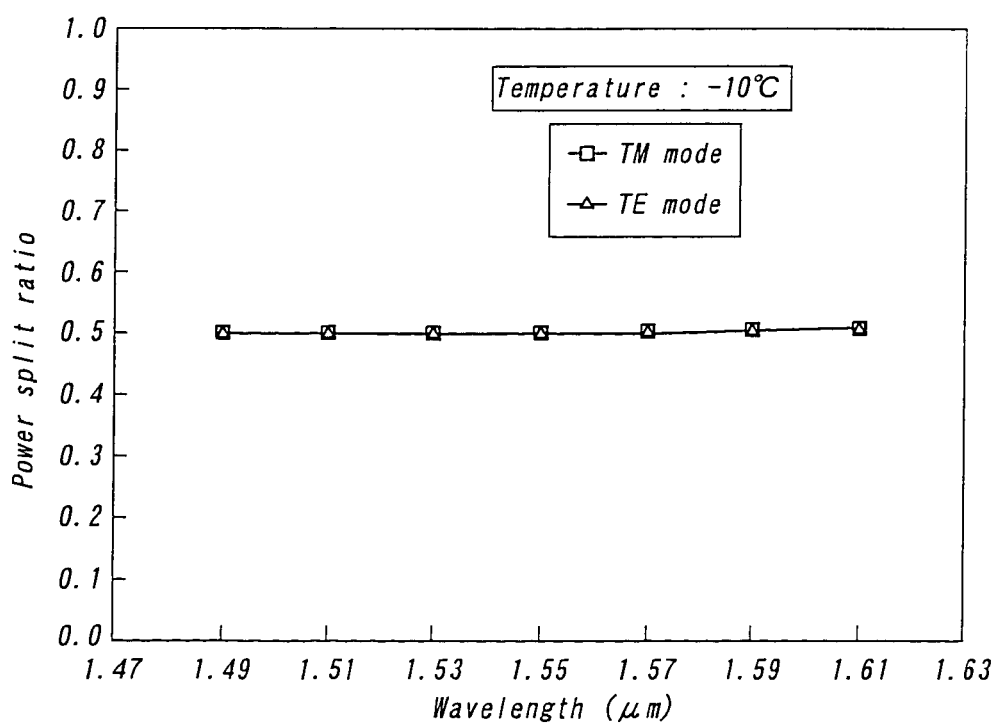
FIG. 4 shows a graph representing the split ratio of the embodiment shown in FIG. 1 to an optical signal when the wavelength and the polarization of the optical signal is varied and the ambient temperature is kept at −10° C.
Figure 5:
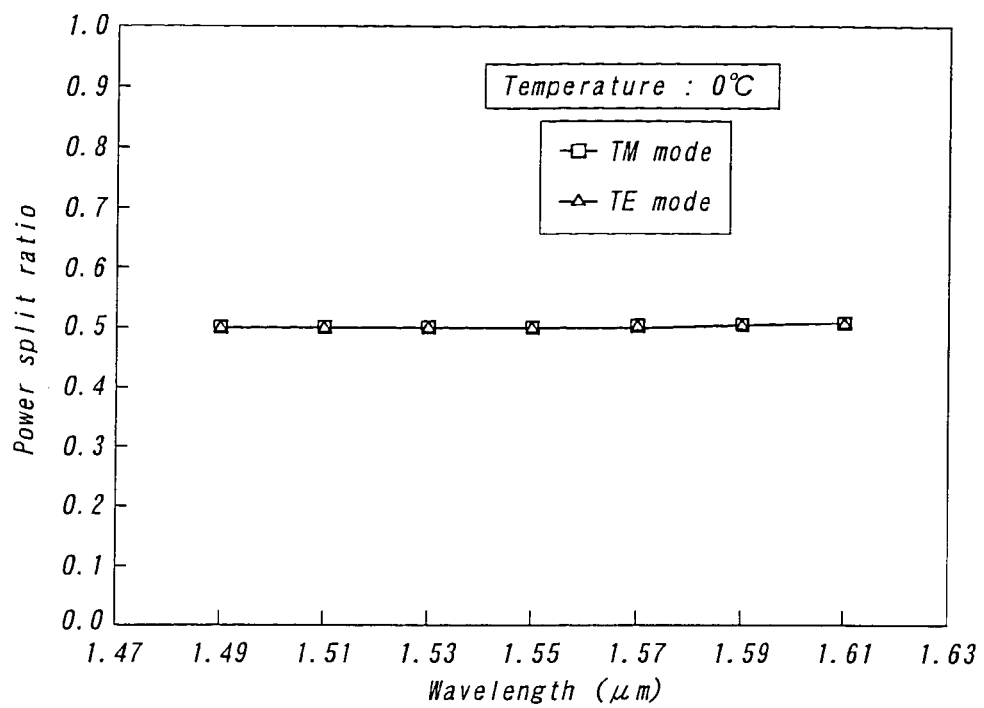
FIG. 5 shows a graph representing the split ratio of the embodiment shown in FIG. 1 to an optical signal when the wavelength and the polarization of the optical signal is varied and the ambient temperature is kept at 0° C.
Figure 6:
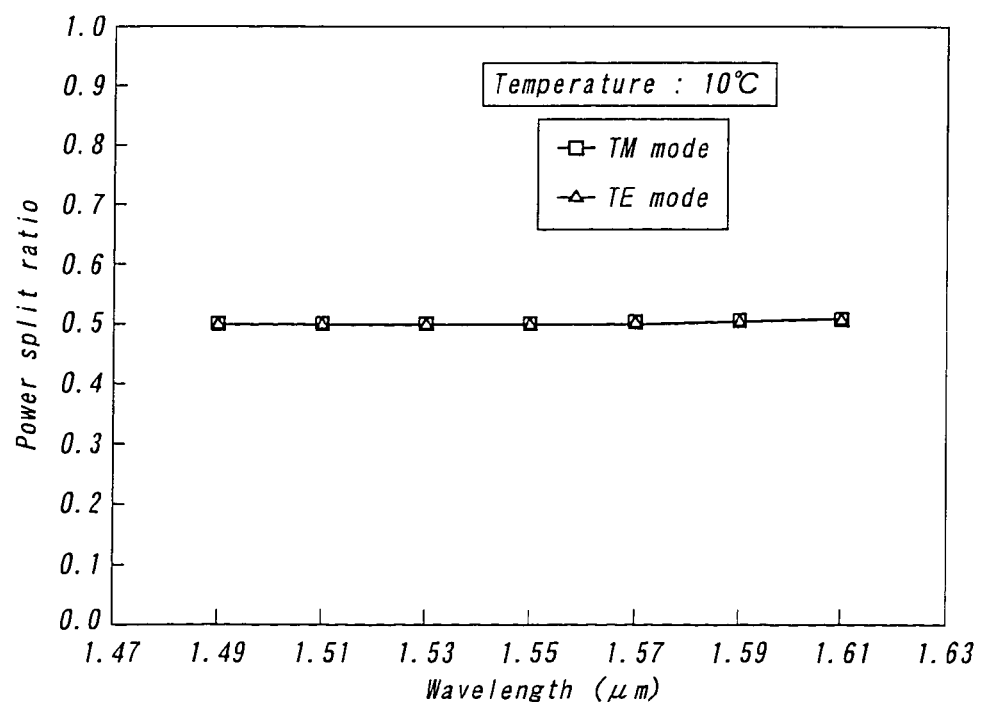
FIG. 6 shows a graph representing the split ratio of the embodiment shown in FIG. 1 to an optical signal when the wavelength and the polarization of the optical signal is varied and the ambient temperature is kept at 10° C.
Figure 7:
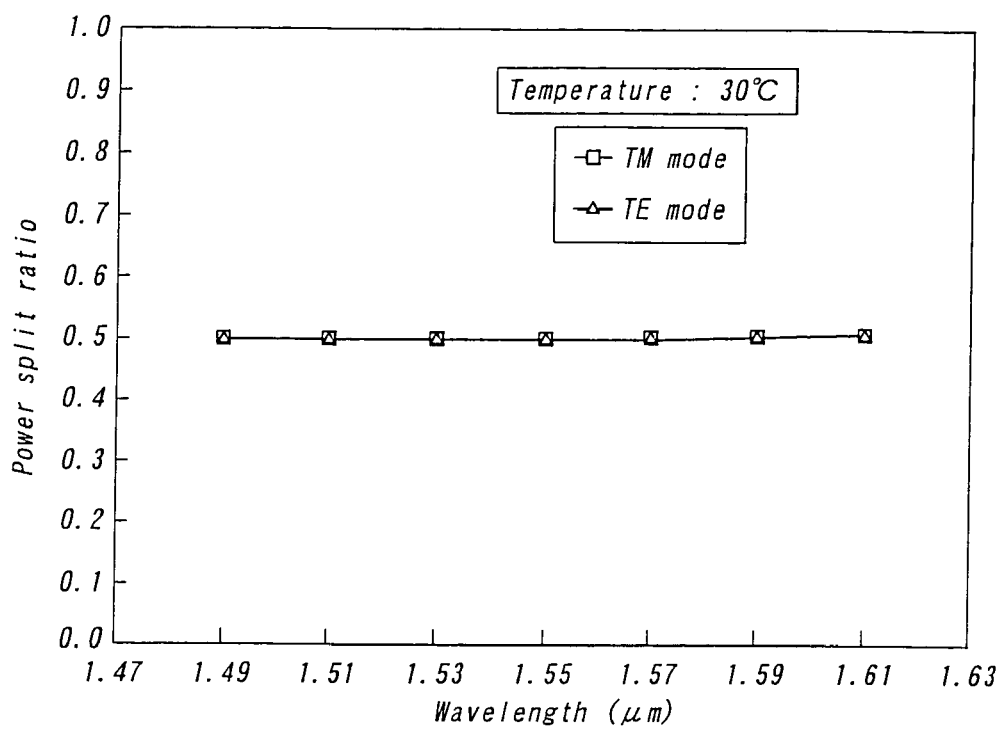
FIG. 7 shows a graph representing the split ratio of the embodiment shown in FIG. 1 to an optical signal when the wavelength and the polarization of the optical signal is varied and the ambient temperature is kept at 30° C.
Figure 8:
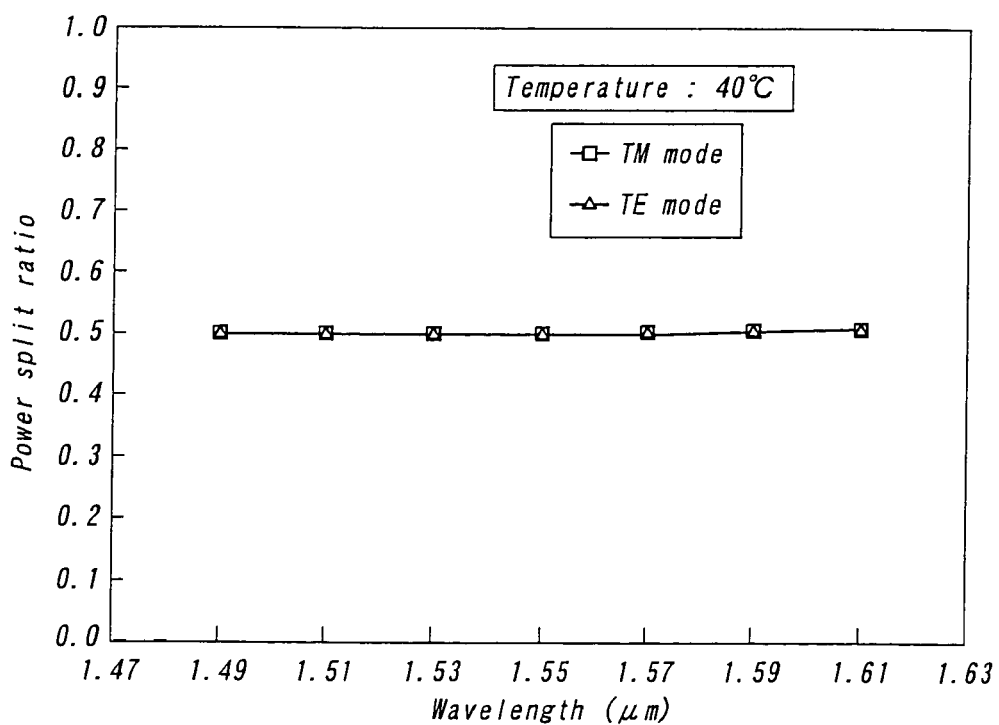
FIG. 8 shows a graph representing the split ratio of the embodiment shown in FIG. 1 to an optical signal when the wavelength and the polarization of the optical signal is varied and the ambient temperature is kept at 40° C.
Figure 9:
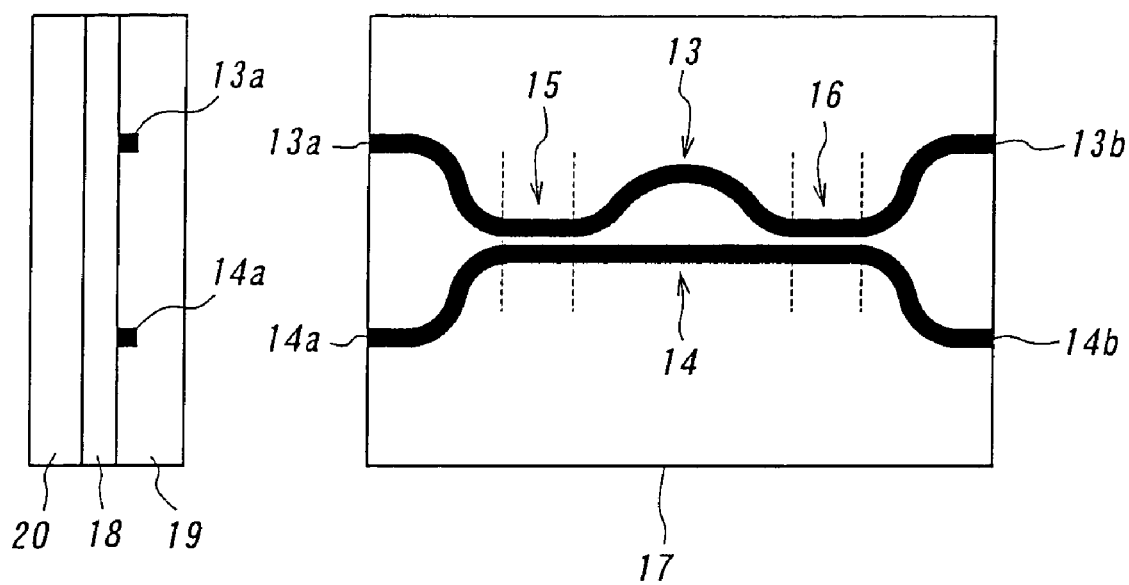
FIG. 9 shows a top and lateral view of a Mach-Zehnder interferometer type optical waveguide circuit 17

In an environment where the temperature was kept at 20° C., the polymeric optical waveguide coupler circuit 8 stable to the changes of polarization and ambient temperature as shown in FIG. 1 received seven light waves, that is, light waves in TE polarization and TM polarization with the wavelengths of 1490, 1510, 1530, 1550, 1570, 1590 and 1610 nm from a terminal 2a of the optical waveguide core 2. The light waves were split during their passage through the circuit and delivered as outputs from the opposite terminals 2b, 3b of the optical waveguide cores 2, 3. For each light wave, the ratio of its power outputs from the two terminals (power split ratio) was determined, and the power split ratio was plotted as a function of wavelength as seen in FIG. 3. The power split ratio for any wavelengths enclosed in the band width of 120 nm is in the range of 50±0.79%.

Then, the ambient temperature was changed to −10, 0, 10, 30, and 40° C., and the measurement as had been performed on the device kept at 20° C. was repeated. For each temperature, the power split ratio of TE and TM polarization was plotted as a function of wavelength. The results are shown in FIGS. 4, 5, 6, 7 and 8. As seen from the figures, the power split ratios are in the range of 50±0.71, 50±0.73, 50±0.76, 50±0.81, and 50±0.84% respectively. They were hardly affected by the changes of polarization and ambient temperature and wavelength.

Figure 2:
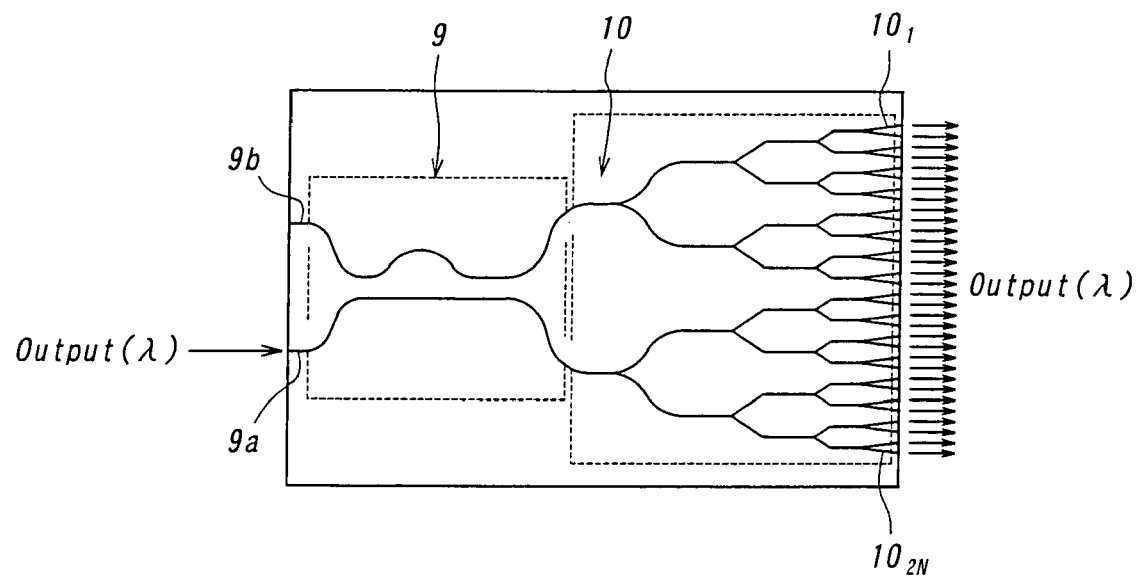
FIG. 2 shows a flat view of a 2×2N splitter as an application of the polymeric optical waveguide circuit.

As seen from above, with the polymeric optical waveguide coupler circuit 8 of this invention stable to the changes of polarization and ambient temperature, optical signals falling within the bandwidth of 120 nm with 1550 nm at their central wavelength which are used in fiber optic communication based on dense wavelength division multiplexing are reliably routed because their wavelength being hardly modified during their passage through the circuit, even when the ambient temperature is changed from −10° C. to 40° C. Accordingly, the polymeric optical waveguide coupler circuit 8 of this invention stable to the changes of polarization and ambient temperature may serve, as one of its applications, as thermally stable couplers 9 independent of polarization constituting a polymeric optical waveguide 2×2N splitter as shown in FIG. 2.

According to this invention, the cross-sections and refractive indices of the waveguides and the parameters of other circuit elements constituting the polymeric optical waveguide coupler circuit device are optimized such that light passing through the device can reliably keep its wavelength unaffected by the changes of polarization and ambient temperature. The effect of the change of polarization and ambient temperature on the power split ratio of the device which would be otherwise manifest is obviously minimized.

As seen from above, with the polymeric optical waveguide coupler circuit device of this invention, optical signals falling within a bandwidth of 120 nm with 1550 nm at its central wavelength which are used in fiber optic communication based on dense wavelength division multiplexing are reliably routed even when the ambient temperature is changed from −10° C. to 40° C., without requiring a certain heat-insulating means, without requiring a certain polarization maintenance means.

Because the optical waveguide circuit device of this invention is optimized as described above, even wavelengths are hardly affected by the change of polarization and ambient temperature, and characteristics dependent of wavelength, polarization and temperature, is suppressed to nearly Zero. Thus, it may be used, as one of its applications, as a thermally stable polymeric optical waveguide 2×2N splitter independent of polarization.

Because the method provided by the present invention optimizes the optical waveguide coupling circuit device using the same materials as used in the conventional optical waveguide device, it is not necessary to alter the conventional fabrication processes themselves. Thus, the method of this invention, maintaining the advantage of the conventional method of producing a polymeric optical waveguide device, that is, the low production cost, ensures the production of an optical waveguide circuit device stable to the changes of polarization and ambient temperature.

What is claimed is:

1. An optical waveguide coupler circuit device comprising:
    a substrate;
    a polymeric lower cladding layer formed on the substrate;
    at least two polymeric optical waveguides formed on the polymeric lower cladding layer;
    a polymeric upper cladding layer covering the optical waveguides; and
    plural directional couplers which are obtained by choosing any pair from the at least two optical waveguides, and bringing them close to each other at plural sites, wherein:
    each of the optical waveguides has two ends, one end serving as an input terminal and the other as an output terminal;
    the two paired optical waveguides are configured such that the difference between their effective optical paths spanning between arbitrarily chosen adjacent directional couplers is defined as ΔL, and ΔL=0.7 to 0.9 μm;
    each of the plural directional couplers comprises a parallel section at which the two optical waveguides are disposed in parallel with each other; and
    the polymeric optical waveguide is made from a polymer having a refractive index of 1.508 to 1.568 and a birefringence of 0.008 to 0.01.

2. An optical waveguide coupler circuit device as described in claim 1 wherein the polymeric lower cladding layer is made from a polymer having a refractive index of 1.503 to 1.562 and a birefringence of 0.008 to 0.01.

3. An optical waveguide coupler circuit device as described in claim 1 wherein the polymeric upper cladding layer is made from a polymer having a refractive index of 1.503 to 1.562 and a birefringence of 0.008 to 0.01.

4. An optical waveguide coupler circuit device as described in claim 1 wherein the length of the two optical waveguides of one directional coupler is chosen to be 0.101 to 0.128 mm while the length of the two optical waveguides of the other directional coupler is chosen to be 1.454 to 1.612 mm.

5. An optical waveguide coupler circuit device as described in claim 1 wherein a gap between two parallel running waveguides is chosen to be 4.3 to 5.1 μm for both directional couplers.

6. An optical waveguide coupler circuit device as described in claim 1 wherein each of the optical waveguides is configured to have an oblong cross-section having a width w and a thickness t.

7. An optical waveguide coupler circuit device as described in claim 1 wherein each of the optical waveguides is configured to have a square cross-section.

8. An optical waveguide coupler circuit device as described in claim 1 wherein each of the optical waveguides is configured to have a square cross-section with a side of 6 to 8 μm.

9. An optical waveguide coupler circuit device as described in claim 1 wherein a lower cladding layer of the optical waveguides is configured to have a thickness of 20 μm.

10. An optical waveguide coupler circuit device as described in claim 1 wherein the substrate is made of a quartz plate.

11. An optical waveguide coupler circuit device as described in claim 1 wherein the substrate is made of a silicon plate.

12. An optical waveguide coupler circuit device as described in claim 1 wherein the substrate is made of a polyimide resin plate.

* * * * *